United States Patent
Fox et al.

(10) Patent No.: US 8,478,560 B2
(45) Date of Patent: Jul. 2, 2013

(54) THREE WIRE TRANSFORMER POSITION SENSOR, SIGNAL PROCESSING CIRCUITRY, AND TEMPERATURE COMPENSATION CIRCUITRY THEREFOR

(75) Inventors: Richard Fox, Mesa, AZ (US); Gene Holden, Scottsdale, AZ (US); Robert Franconi, New Hartford, CT (US)

(73) Assignee: Honeywell International Inc., Morristown, NJ (US)

( * ) Notice: Subject to any disclaimer, the term of this patent is extended or adjusted under 35 U.S.C. 154(b) by 351 days.

(21) Appl. No.: 13/009,577

(22) Filed: Jan. 19, 2011

(65) Prior Publication Data

US 2012/0185207 A1    Jul. 19, 2012

(51) Int. Cl.
  *G06F 19/00*    (2011.01)
(52) U.S. Cl.
  USPC .......... 702/150; 324/207.12; 324/207.17; 324/207.18; 324/207.22; 324/207.23; 324/207.24
(58) Field of Classification Search
  USPC .......... 702/150; 324/207.13, 207.12, 207.18, 324/207.17, 207.22, 207.23, 207.24, 207.25; 336/45; 335/209, 299
  See application file for complete search history.

(56) References Cited

U.S. PATENT DOCUMENTS

| | | | |
|---|---|---|---|
| 2,452,862 A | 11/1948 | Neff | |
| 3,010,063 A | 11/1961 | Rhoades | |
| 3,992,680 A | 11/1976 | Herzl | |
| 4,125,021 A * | 11/1978 | Kamei et al. | 73/304 R |
| 4,599,560 A | 7/1986 | Sanford et al. | |
| 4,623,840 A | 11/1986 | Fujimura et al. | |
| 4,628,499 A | 12/1986 | Hammett | |
| 4,634,126 A | 1/1987 | Kimura | |
| 4,816,830 A | 3/1989 | Cooper | |
| 4,866,378 A | 9/1989 | Redlich | |
| 4,866,437 A | 9/1989 | Morra | |
| 4,904,921 A | 2/1990 | DeVito et al. | |
| 4,942,397 A | 7/1990 | Real | |
| 4,954,776 A | 9/1990 | Husher | |
| 5,010,298 A | 4/1991 | Uemura | |
| 5,036,275 A * | 7/1991 | Munch et al. | 324/207.17 |
| 5,043,661 A | 8/1991 | Dubey | |
| 5,066,911 A | 11/1991 | Hulsing, II. | |
| 5,072,165 A * | 12/1991 | Mimura | 318/558 |
| 5,115,193 A | 5/1992 | Bean et al. | |
| 5,180,978 A | 1/1993 | Postma et al. | |
| 5,180,979 A | 1/1993 | Frazzini et al. | |
| 5,210,490 A * | 5/1993 | Munch et al. | 324/207.17 |
| 5,216,364 A * | 6/1993 | Ko et al. | 324/207.24 |
| 5,307,690 A | 5/1994 | Hanazawa | |
| 5,469,053 A | 11/1995 | Laughlin | |
| 5,477,473 A | 12/1995 | Mandl et al. | |

(Continued)

*Primary Examiner* — Carol Tsai
(74) *Attorney, Agent, or Firm* — Ingrassia Fisher & Lorenz, P.C.

(57) ABSTRACT

A three-wire transformer position sensor is provided that includes an excitation coil and an output coil. The excitation coil is adapted to be electrically excited with an excitation signal, and has a first end and a second end. The output coil includes a first coil and a second coil and is inductively coupled to the excitation coil upon electrical excitation thereof the excitation coil. The first end of the first coil is electrically connected to the second end of the second coil and to the second end of the excitation coil, and the second end of the first coil is electrically connected to the first end of the second coil. The output coil is configured, when it is balanced and the excitation coil is being electrically excited, to supply a null output signal.

20 Claims, 4 Drawing Sheets

U.S. PATENT DOCUMENTS

| | | | |
|---|---|---|---|
| 5,504,427 A * | 4/1996 | Cooper et al. | 324/207.17 |
| 5,621,398 A | 4/1997 | Blair et al. | |
| 5,642,043 A * | 6/1997 | Ko et al. | 324/207.24 |
| 5,811,967 A * | 9/1998 | Shank et al. | 324/207.24 |
| 5,914,593 A | 6/1999 | Arms et al. | |
| 6,034,624 A | 3/2000 | Goto et al. | |
| 6,642,710 B2 * | 11/2003 | Morrison et al. | 324/207.12 |
| 6,753,686 B2 | 6/2004 | Tsuboi | |
| 6,828,779 B2 | 12/2004 | Townsend et al. | |
| 6,864,808 B2 | 3/2005 | McBrien | |
| 7,061,229 B2 * | 6/2006 | Townsend et al. | 324/207.12 |
| 7,459,904 B2 | 12/2008 | Proksch et al. | |
| 7,511,477 B2 | 3/2009 | Niwa | |
| 7,956,603 B2 * | 6/2011 | Cochran | 324/207.17 |
| 2001/0020910 A1 | 9/2001 | Noro et al. | |
| 2003/0161735 A1 * | 8/2003 | Kim et al. | 417/44.1 |
| 2004/0056653 A1 | 3/2004 | Bocek et al. | |
| 2004/0119470 A1 * | 6/2004 | Yajima et al. | 324/253 |
| 2007/0024274 A1 | 2/2007 | Riedel et al. | |
| 2010/0194225 A1 * | 8/2010 | Allaire et al. | 310/90.5 |
| 2012/0176124 A1 * | 7/2012 | Szulyk et al. | 324/207.18 |
| 2012/0225784 A1 * | 9/2012 | Piascik et al. | 505/150 |
| 2013/0021125 A1 * | 1/2013 | Piascik et al. | 335/299 |

* cited by examiner

THREE WIRE TRANSFORMER POSITION SENSOR, SIGNAL PROCESSING CIRCUITRY, AND TEMPERATURE COMPENSATION CIRCUITRY THEREFOR

TECHNICAL FIELD

The present disclosure generally relates to position sensors and associated signal processing circuitry, and more particularly to a three-wire, transformer position sensor and associated signal processing and temperature compensation circuitry.

BACKGROUND

Position sensors are included in various systems, devices, and environments. Moreover, various types of position sensors have been developed for inclusion into these various systems, devices, and environments. One particular genre of position sensor that has been developed is the transformer position sensor. A transformer position sensor typically includes a primary or excitation coil, a secondary or output coil, a movable magnetically permeable core, and five wires to interconnect the sensor to external excitation and processing circuitry. When the excitation coil is electrically excited with an excitation signal, the output coil is inductively coupled to the excitation coil and supplies an output signal that is based on the position of the movable core. One particularly popular type of transformer position sensor is the variable differential transformer position sensor, which includes linear variable differential transformers (LVDTs) and rotary variable differential transformers (RVDTs). A variable differential transformer position sensor also includes an excitation coil, an output coil, and a movable magnetically permeable core. However, with variable differential transformer position sensors either the excitation coil or the output coil is configured as a pair of differentially wound coils that are electrically coupled in series.

The above-described transformer position sensors have been used for several years in relatively harsh aircraft environments where position sensing is need, such as within the gas turbine engine envelope. Thus, reliability issues have driven some gas turbine engine manufacturers to use these transformer position sensors, namely LVDTs, to replace the switches that are currently used to supply two discrete (e.g., open or closed) valve position signals. Although presently known transformer position sensors are generally safe, reliable, and robust, ever increasing demand for relatively lower cost and weight, and the opportunity to simplify aircraft architecture have driven the need to create an alternative to a 5-wire transformer position sensor to detect the position of a two-position valve. The present invention addresses at least this need.

BRIEF SUMMARY

In one embodiment, a position sensor includes an excitation coil and an output coil. The excitation coil is adapted to be electrically excited with an excitation signal, and has a first end and a second end. The output coil is inductively coupled to the excitation coil upon electrical excitation of the excitation coil, and is and configured, when it is balanced and the excitation coil is being electrically excited, to supply a null output signal. The output coil includes a first coil having a first end and a second end, and a second coil having a first end and a second end. The first end of the first coil is electrically connected to the second end of the second coil and to the second end of the excitation coil, to thereby define a common node. The second end of the first coil is electrically connected to the first end of the second coil, to thereby define a signal output node. The first end of the excitation coil defines an excitation node.

In another embodiment, a position sensor includes an excitation coil, an output coil, and a core. The excitation coil is adapted to be electrically excited with an excitation signal, and has a first end and a second end. The output coil is inductively coupled to the excitation coil upon electrical excitation of the excitation coil, and is and configured, when it is balanced and the excitation coil is being electrically excited, to supply a null output signal. The output coil includes a first coil and a second coil. The core is disposed adjacent, and movable relative to, the excitation coil and the output coil, and is operable, upon movement thereof, to vary the inductive coupling between the excitation coil and the output coil. The first coil has a first end and a second end, and the second coil has a first end and a second end. The first end of the first coil is electrically connected to the second end of the second coil and to the second end of the excitation coil, to thereby define a common node. The second end of the first coil is electrically connected to the first end of the second coil, to thereby define a signal output node. The first end of the excitation coil defines an excitation node.

In a further embodiment, a position sensor includes an excitation coil, an output coil, a core, a constant current circuit, a filter circuit, a plurality of resistors, and a processor. The excitation coil is coupled to receive an excitation signal, and has a first end and a second end. The output coil is inductively coupled to the excitation coil upon electrical excitation thereof, and is and configured, when it is balanced and the excitation coil is being electrically excited, to supply a null output signal. The output coil includes a first coil having a first end and a second end, and a second coil having a first end and a second end. The core is disposed adjacent, and movable relative to, the excitation coil and the output coil, and is operable, upon movement thereof, to vary the inductive coupling between the excitation coil and the output coil. The constant current circuit is coupled to the excitation coil, and is configured to supply a constant direct current (DC) to the excitation coil. The filter circuit is coupled to the excitation coil to receive a voltage signal representative of a voltage drop across the excitation coil and is configured, upon receipt thereof, to supply a temperature signal having a voltage amplitude magnitude that is proportional to excitation coil temperature. Each of the resistors has a first terminal and a second terminal and a resistance value unequal to another one of the resistors. The first terminal of each resistor is adapted to receive a voltage from an electric power source. The processor has a plurality of pins, each of which is individually coupled to the second terminal of one of the resistors. The processor is configured to selectively draw current from the electric power source through each of the resistors to thereby generate and supply a stair-step sinusoidal excitation voltage for the excitation coil, receive an output signal from the output coil, and upon receipt of the output signal, supply a position signal representative of relative core position. The first end of the first coil is electrically connected to the second end of the second coil and to the second end of the excitation coil, to thereby define a common node. The second end of the first coil is electrically connected to the first end of the second coil, to thereby define a signal output node. The first end of the excitation coil defines an excitation node.

In yet another embodiment, a temperature compensation circuit for an inductive position sensor that has at least an excitation coil includes a constant current circuit and a filter circuit. The constant current circuit is coupled to the excitation coil, and is configured to supply a constant direct current (DC) to the excitation coil. The filter circuit is coupled to the excitation coil to receive a voltage signal representative of a voltage drop across the excitation coil and is configured, upon receipt thereof, to supply a temperature signal having a voltage amplitude magnitude that is proportional to excitation coil temperature.

In yet still another embodiment, a signal processing circuit for an inductive position sensor that has at least an excitation coil, an output coil, and a core disposed adjacent and movable relative to the excitation coil and the output coil, includes a plurality of resistors and a processor. Each of the resistors has a first terminal and a second terminal and a resistance value unequal to another one of the resistors. The first terminal of each resistor is adapted to receive a voltage from an electric power source. The processor has a plurality of pins, each of which is individually coupled to the second terminal of one of the resistors. The processor is configured to selectively draw current from the electric power source through each of the resistors to thereby generate and supply a stair-step sinusoidal excitation voltage for the excitation coil, receive an output signal from the output coil, and upon receipt of the output signal, supply a position signal representative of relative core position.

Furthermore, other desirable features and characteristics of the sensor, processing circuitry, and temperature compensation circuitry will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
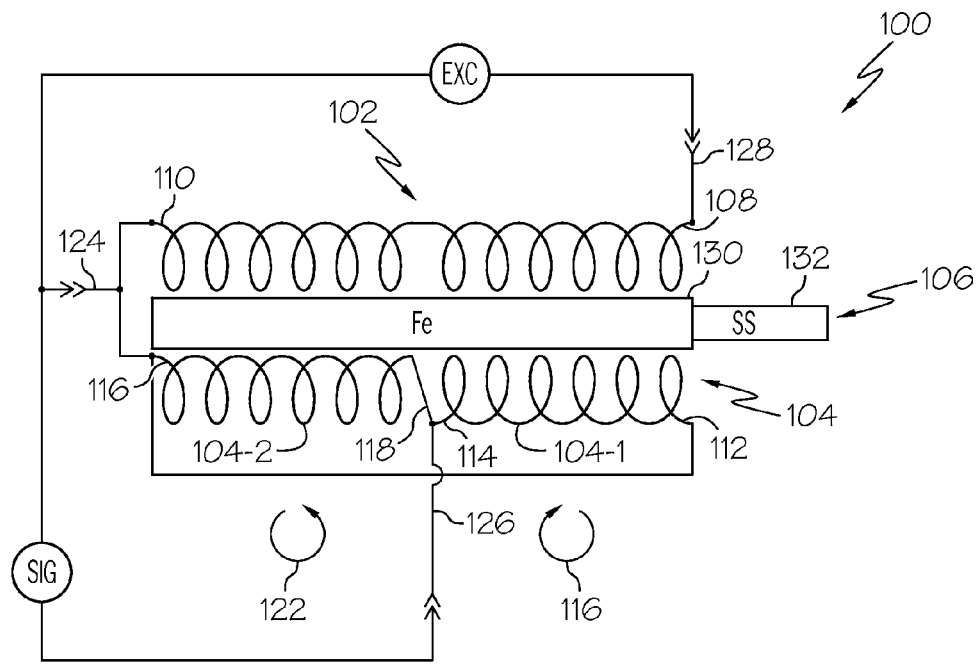
FIG. 1 depicts a schematic diagram of an exemplary embodiment of a 3-wire transformer position sensor for a relatively short (e.g., minimum) core stroke length.

Referring to FIG. 1, a schematic diagram of an exemplary embodiment of transformer position sensor 100 is depicted and includes an excitation (or primary) coil 102, an output (or secondary) coil 104, and a core 106. The excitation coil 102 is adapted to be electrically excited with an excitation signal, and has a first end 108 and a second end 110. The output coil 104 is disposed such that it is inductively coupled to the excitation coil 102 when the excitation coil 102 is electrically excited. As a result, when the excitation coil 102 is electrically excited with an excitation signal, the output coil 104 at least selectively supplies an output signal to a non-illustrated load. As will be explained further below, the amplitude magnitude and relative phase of the output signal may vary, depending upon the relative position of the core 106. It will be appreciated that the relative disposition of the excitation coil 102 and the output coil 104 may vary. For example, in some embodiments, the excitation and output coils 102, 104 may be concentrically disposed with the output coil 104 surrounding, or at least partially surrounding, the excitation coil 102, or vice-versa, whereas in other embodiments the coils 102, 104 may be disposed non-concentrically adjacent each other.

No matter the specific relative disposition of the excitation and output coils 102, 104, it is seen that the output coil 104 includes a first coil 104-1 and a second coil 104-2. It will be appreciated that the first and second coils 104-1, 104-2 may be formed from a single conductor or formed from separate conductors and then connected together. In either case, the first and second coils 104-1, 104-2 are wound and configured such that the output signal supplied from output coil 104 is a null signal when the excitation coil 102 is electrically excited with an excitation signal and the output coil 104 is balanced. In the depicted embodiment, this result in implemented by winding the first and second coils 104-1, 104-2 in different directions. That is, the first coil 104-1 has a first end 112 and a second end 114, and is wound in a first (or clockwise) direction 116 between its first and second ends 112, 114, and the second coil 104-2 also has a first end 118 and a second end 120, but is wound in a second (or counterclockwise) direction 122 between its first and second ends 118, 120. It will be appreciated that this is merely one of numerous ways in which the Before proceeding further, it is noted that the depicted excitation coil 102, like the depicted second coil 104-2, is wound in the second (counterclockwise) direction 122 between its first and second end 108, 110. It will be appreciated, however, that in other embodiments it could be wound in the first (clockwise) direction 116. It will additionally be appreciated that the excitation coil 102 and the output coil 104 may be formed using various types of electrically conductive wire. For those embodiments that may be exposed to relatively high temperatures (e.g., 600F-1,000F), the excitation coil 102 and output coil 104 are preferably formed using a ceramic-insulated wire, such as a ceramic-insulated nickel wire. It will be appreciated, however, that any one of numerous other types of wire, including, but not limited to, polyimide coated copper, anodized aluminum, and glass coated wire, may be used.

Returning once again to the description, the excitation coil 102 and output coil 104 are connected such that the first end 112 of the first coil 104-2 is electrically connected to the second end 120 of the second coil 104-2 and to the second end 110 of the excitation coil 102, to thereby define a common node 124. The second end 114 of the first coil 104-2 is electrically connected to the first end 118 of the second coil 104-2, to thereby define a signal output node 126. And the first end 108 of the excitation coil 102 defines an excitation node 128. The sensor 100 is thus configured as a 3-wire device, as opposed to a 5-wire device. As FIG. 1 further depicts, during operation non-depicted circuitry may supply an excitation signal (EXC) across the excitation node 128 and the common node 124, and non-depicted circuitry may process an output signal (SIG) that is generated across the signal output node 126 and the common node 124.

The core 106 is disposed adjacent, and is movable relative to, the excitation coil 102 and the output coil 104. The core 106 is configured such that, when the excitation coil 102 is electrically excited with an excitation signal, movement of the core 106 varies the inductive coupling between the excitation coil 102 and the output coil 104. The core 106 is preferably constructed of one or more sections of a magnetically permeable material 130 and one or more sections of a non-magnetically permeable material 132. Although the particular types of materials may vary, in a particular embodiment, the magnetically permeable material 130 is a ferrous material and the non-magnetically permeable material 132 is a stainless steel material.

Figure 7:
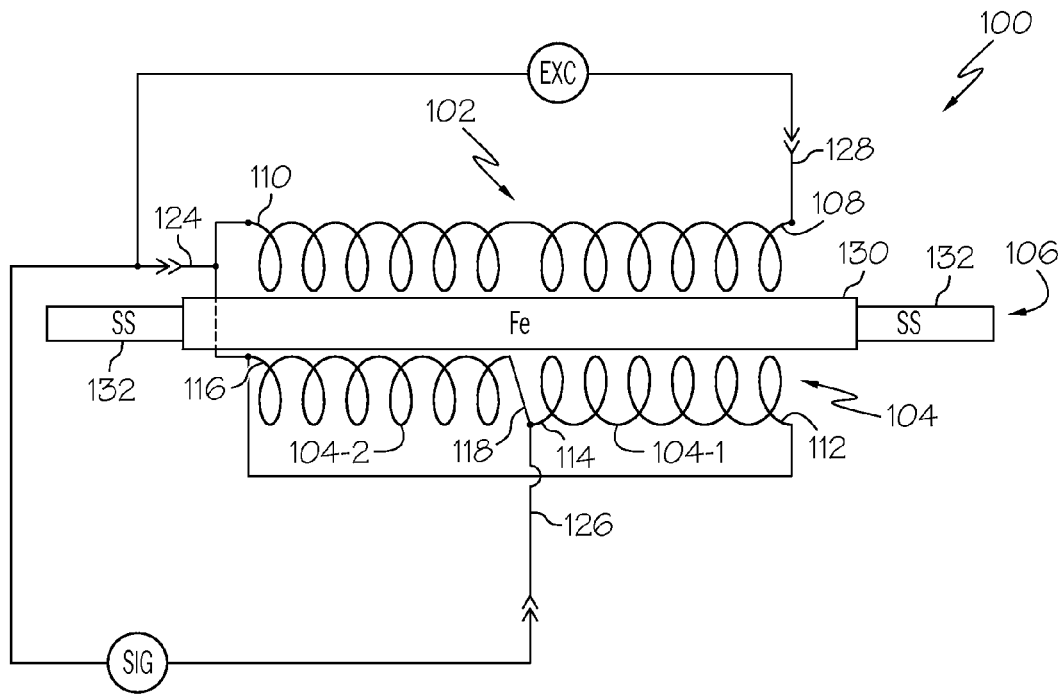
FIG. 7 depicts a schematic diagram of an exemplary embodiment of a 3-wire transformer position sensor for a relatively long (e.g., non-minimum) core stroke length.

In the embodiment depicted in FIG. 1, the core 106 is constructed of a single section of magnetically permeable material 130 and a single section of non-magnetically permeable material 132. It is noted that the single section of magnetically permeable material 130 may be about the same length as, or longer than, the excitation coil 102 and output coil 104, depending upon the stroke length of the core 106. In the embodiment depicted in FIG. 1, the stroke length is relatively short (e.g., a minimum stroke length), and thus the single section of magnetically permeable material 130 is about the same length as the excitation coil 102 and output coil 104. For completeness, an exemplary embodiment of the sensor 100 in which the stoke length of the core is relatively long (e.g., not a minimum stroke length) is depicted in FIG. 7, thus the single section of magnetically permeable material 130 is longer than the excitation coil 102 and output coil 104.

Figure 2:
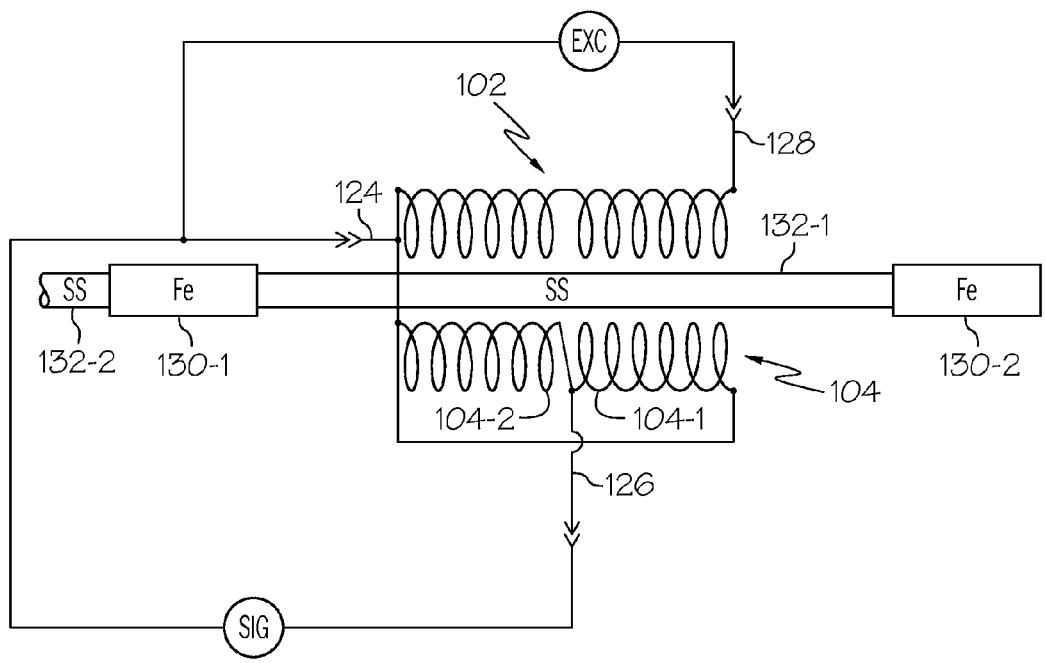
FIG. 2 depicts an exemplary embodiment of the 3-wire transformer position sensor of FIG. 1, but that is implemented with a core having plural sections of magnetically permeable material and non-magnetically permeable material and a relatively long (e.g., non-minimum) core stroke length.

The non-magnetically permeable material 132 is preferably connected to a non-depicted device, such as a valve (or valve actuator), the position of which is being sensed. In other embodiments, in which the core 106 is implemented with plural sections of magnetically permeable material 130 and non-magnetically permeable material 132, each section of magnetically permeable material 130 is interposed by, and coupled to, a section of non-magnetically permeable material 132. An exemplary embodiment of the core 106 implemented with plural sections of magnetically permeable material 130 (e.g., 130-1, 130-2) and non-magnetically permeable material 132 (132-1, 132-2, 132-3) is depicted in FIG. 2. As will be described momentarily, the spacing between the sections of magnetically permeable material 130 may vary, depending upon the desired stroke length of the core 106.

Whether the core 106 is implemented with single or multiple sections of magnetically permeable material 130 and non-magnetically permeable material 132, when the excitation coil 102 is electrically excited with an excitation signal (EXC), movement of the core 106, as noted above, varies the inductive coupling between the excitation coil 102 and the output coil 104, and thus results in variations in the output signal (SIG). More specifically, the sensor 100 may be configured such that movement of the magnetically permeable material 130 causes the output signal (SIG) to vary in both amplitude and phase, relative to the excitation signal. The amplitude and phase variations may then be used to provide a binary output signal from non-depicted output circuitry to thus indicate, for example, the position of a valve as being open or closed.

Figure 3:
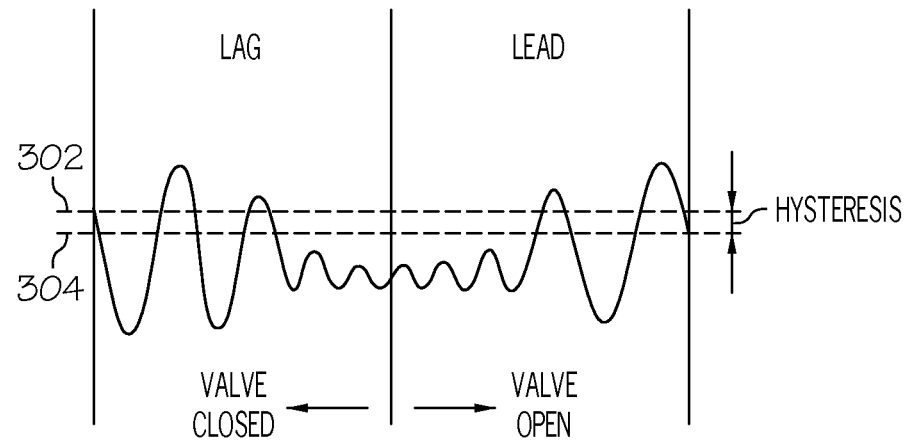
FIG. 3 depicts relative variations in amplitude and phase of the output signal for the sensor of FIG. 1.

For example, when the core 106 is implemented as depicted in FIG. 1, the phase of the output signal (SIG) will lag the excitation signal (EXC) when the magnetically permeable material 130 is moved to one side of the null position (which is the position depicted in FIG. 1), and will lead the excitation signal (EXC) when the magnetically permeable material 130 is moved to the other side of the null position. The relative variations in amplitude and phase of the output signal (SIG) for a sensor 100 that is implemented with a core 106 of a minimum stroke length, whether it has single or multiple sections of magnetically permeable material 130 and non-magnetically permeable material 132, are depicted in FIG. 3. The relative variations in amplitude and phase of the output signal (SIG) for a sensor 100 that is implemented with a core 106 of non-minimum stroke length, whether it has single or multiple sections of magnetically permeable material 130 and non-magnetically permeable material 132 are depicted in FIG. 4.

Figure 4:
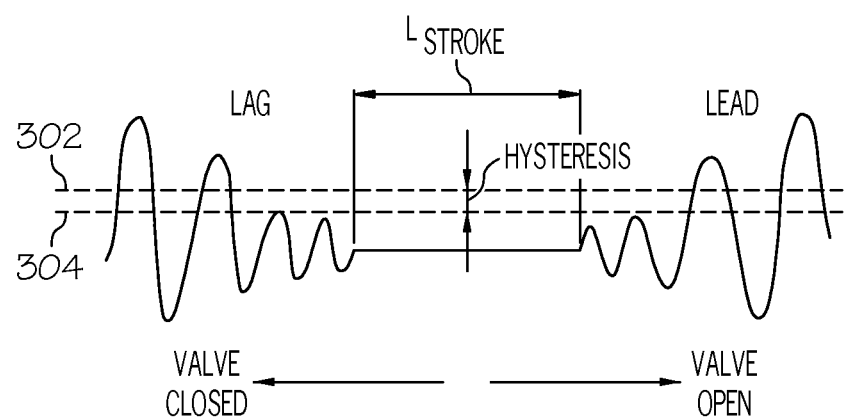
FIG. 4 depicts relative variations in amplitude and phase of the output signal for the sensors of FIGS. 2 and 7.

Also depicted in FIGS. 3 and 4 are exemplary detection threshold levels, with appropriate hysteresis, that may be used to indicate device position. It will be appreciated that the relative amount by which the output signal (SIG) lags and leads the excitation signal (EXC) when the magnetically permeable material 130 is positioned to either side of the null position may vary. It will additionally be appreciated that the manner in which the output signal (SIG) is processed and the detection thresholds determined may vary. For example, the output signal (SIG) may be rectified to a DC signal, the RMS value of the output signal may be detected, peak signal detection may be implemented, or peak-to-peak signal detection may be implemented, just to name a few. It should additionally be noted that the "null position" of the magnetically permeable material 130, as used herein, refers to a position of the core 106 that results in the output coil 104 being balanced. As noted above, when the output coil 104 is balanced, the output signal (SIG) supplied therefrom is a null signal.

Thus, when the sensor 100 is used to detect the position of a valve, a "VALVE CLOSED" position may be indicated when the amplitude magnitude of the output signal (SIG) exceeds a set threshold voltage magnitude 302, and lags the excitation signal (EXC). The "VALVE CLOSED" position will remain until the amplitude magnitude of the output signal (SIG) decreases below a reset voltage magnitude 304. Conversely, a "VALVE OPEN" position may be indicated when the amplitude magnitude of the output signal (SIG) exceeds the set threshold voltage magnitude 302, and leads the excitation signal (EXC). The "VALVE OPEN" position will remain until the amplitude magnitude of the output signal (SIG) decreases below the reset voltage magnitude 304.

Figure 5:
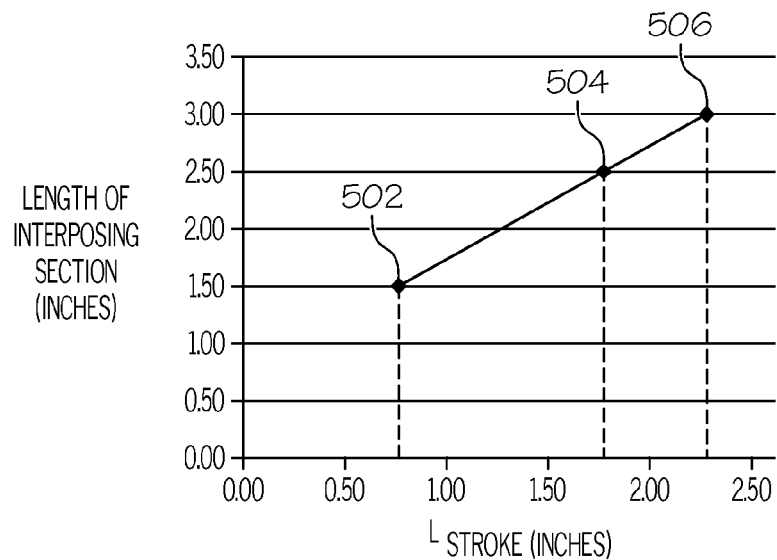
FIG. 5 depicts a graph of the length of an interposing section of non-magnetically permeable material versus desired stroke length.

As FIG. 4 further depicts, when the sensor 100 is implemented with a core 106 having multiple sections of magnetically permeable material 130 and non-magnetically permeable material 132, the output signal (SIG) remains substantially constant (e.g., about 0.0 VAC) when neither section of magnetically permeable material 130-1, 130-2 is positioned to enhance the inductive coupling between the excitation coil 102 and the output coil 104. In this regard, it has been discovered that the desired stroke length ($L_{STROKE}$) of a core 106 having multiple sections of magnetically permeable material 130 and non-magnetically permeable material 132 is a linear function of the length of the interposing section of non-magnetically permeable material 132-2, down to a minimum that is a function of the length of each of the first and second coils 104-1, 104-2. A graph depicting this linear function for coil lengths of 0.68 inches is depicted in FIG. 5. For this particular coil length, the minimum data point 502 indicates that the minimum stroke length is 0.75 inches, for which the length of the interposing section of non-magnetically permeable material 132-2 is 1.50 inches. This graph includes two additional specific data points 504, 506, which indicate that for desired stroke lengths of 1.75 inches and 2.25 inches, the length of the interposing section of non-magnetically permeable material 132-2 is 2.50 inches and 3.00 inches, respectively.

Figure 6:
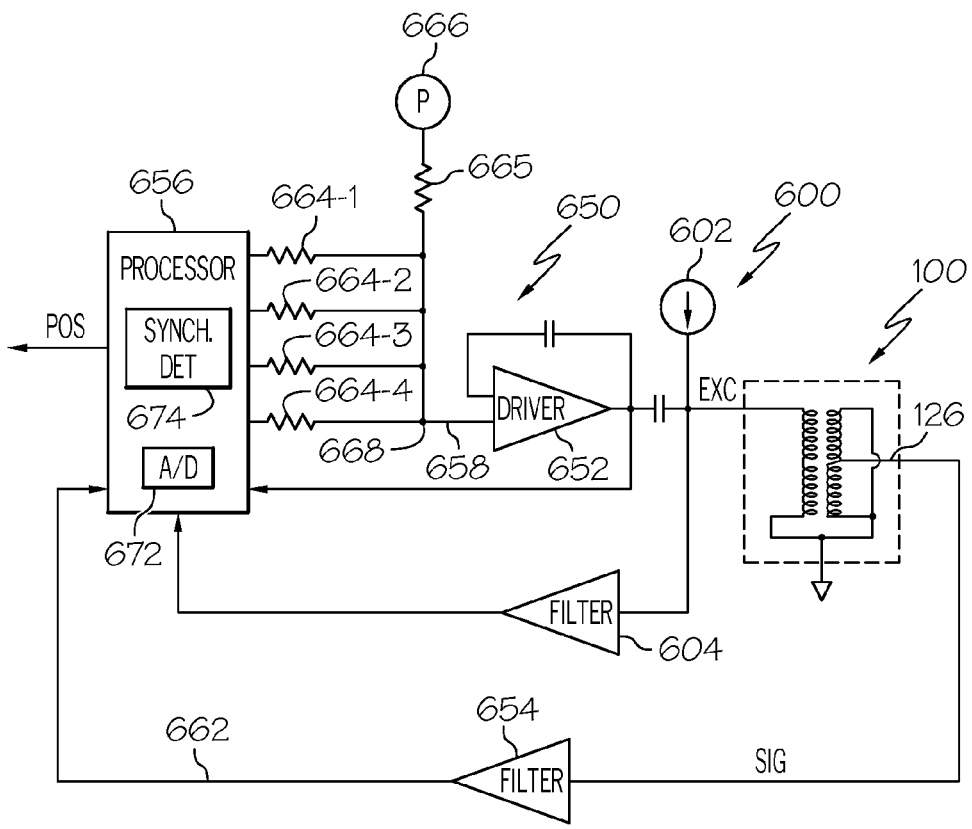
FIG. 6 depicts functional block diagrams of embodiments of temperature compensation and the signal processing circuits that may be used with the sensor of FIGS. 1, 2, 7.

For many of the materials that may be used to implement the core 106, it is generally known that the permeability of such materials changes with temperature. For example, the change in permeability of iron is fairly linearly as temperature increases from 0° F. to 600° F., and becomes increasingly non-linear above 600° F. As may be appreciated, the RMS voltage of the output signal (SIG) is a function of the change in permeability with temperature. Thus, to improve the accuracy and signal-to-noise ratio of the sensor 100, especially above 600° F., this temperature dependence should be corrected. To do so, a temperature compensation circuit is preferably provided and is coupled both to the sensor 100 and to a signal processing circuit. Particular embodiments of the temperature compensation circuit 600 and the signal processing circuit 650, and their respective interconnections to each other and to the sensor 100, are depicted in FIG. 6 and with reference thereto will now be described.

The depicted temperature compensation circuit 600 includes a constant current source 602 and a filter circuit 604. The constant current source 602 is coupled to, and is configured to supply a constant DC current to, the excitation coil 102. The filter circuit 604 is coupled to, and is configured to sense the voltage drop across, the excitation coil 102. As will be described further below, the signal processing circuit 650 is also coupled to the excitation coil 102, and is configured to supply the excitation signal (EXC) thereto. Thus, the filter circuit 604 is configured to filter out the AC components of the voltage drop across the excitation coil 102, while passing the DC component. It will be appreciated that the constant current source 602 may be implemented using any one of numerous known constant current source circuit configurations. Similarly, the filter circuit 604 may be implemented using any one of numerous known analog or digital filter circuit configurations.

As the temperature of the sensor 100 varies, not only will the permeability of the core 106 vary, but the resistance of the excitation coil 102 will also vary. With the depicted and above-described temperature compensation circuit 600, however, the constant current source 602 will maintain the DC current flow through the excitation coil 102 substantially constant, despite the variations in resistance. Thus, the voltage drop across the excitation coil 102 will vary proportionally with the temperature variations. The voltage drop across the excitation coil 102 is supplied, as a voltage signal from the filter circuit 604, to the signal processing circuit 650. The signal processing circuit 650, an embodiment of which will now be described, uses the voltage signal supplied from the filter circuit 604 to compensate for variations in the output signal (SIG) that would otherwise result from the temperature variations.

The signal processing circuit 650 is configured to generate and supply the excitation signal (EXC) to the excitation coil 102, receive the output signal (SIG) from the signal output node 126 of the sensor 100 and, upon receipt of the output signal (SIG), supply a position signal (POS). As noted above, the position signal is representative of the position of a device, such as a valve, to which the core 106 is coupled. To implement this functionality, the signal processing circuit 650, at least in the depicted embodiment, includes a driver 652, a filter 654, and a processor 656.

The driver 652 is coupled to the excitation coil 102 and receives a driver input signal 658. The driver 652 is configured, at least in the depicted embodiment, to implement filtering, to filter the driver input signal 658. The filtered driver input signal is thus the excitation signal (EXC) that is supplied to the excitation coil 102. As FIG. 6 further depicts, and for reasons described further below, the excitation signal (EXC) is also supplied to the processor 656. The filter 654 is coupled to receive the output signal (SIG) from the signal output node 126 of the sensor 100. The filter 654 is configured to suitably condition the output signal (SIG), and supply a conditioned output signal 662 to the processor 656.

The processor 656 is configured to generate and supply the driver input signal 658, and to generate and supply the position signal (POS). To generate the driver input signal 658, a plurality of resistors 664 (e.g., 664-1, 664-2, 664-3, 664-4), each of differing resistance values, are individually coupled between an electric power source 666 (and a series-connected resistance 665) and separate pins of the processor 656. The resistors 664 are also each coupled, via a single node 668, to the input of the driver 652. As may be appreciated, with this configuration the driver input signal 658 is a stair-step sinusoidal voltage signal. It will be appreciated, however, that this is only one of numerous circuit configurations that may be used to generate the stair-step sinusoidal voltage signal. As noted above, the stair-step sinusoidal voltage signal is amplified by the driver 652 to the appropriate drive level for the sensor 100. The driver 652 additionally rolls off high-frequency components to approximate a sine wave. It will be appreciated that the circuit 650 may operate single-ended or double-ended, depending on how it is configured.

The processor 656 is also configured to implement an analog-to-digital (A/D) conversion function 672 and a synchronous detection function 674. The A/D conversion function 672 converts the amplified output signal 662 and the excitation signal (EXC) from analog signals to digital signals. The synchronous detection function 674, using the digital amplified output signal and digital excitation signal, implements any one of numerous known synchronous detection techniques to determine the position of the device which the sensor 100 is sensing, and supply the position signal (POS). As already noted, the position signal (POS) is preferably a binary-type signal to indicate that the device whose position is being sensed is in one of two positions. For example, if the device is a valve, then the position signal (POS) indicates that the valve is in its open position or its closed position.

In addition to the above, the processor 656 may also be configured to implement sensor health functions. For example, sensor health can be determined via monitoring of the amplitude of the output signal (SIG). Additionally, or instead, sensor health can be determined via monitoring of the voltage signal from the filter circuit 604.

Figure 8:
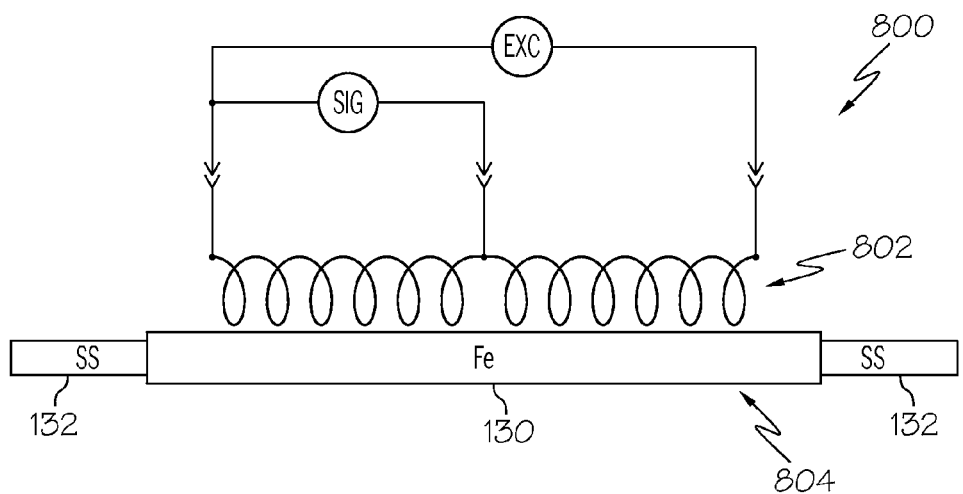
FIG. 8 depicts a schematic diagram of another exemplary embodiment of a 3-wire transformer position sensor implemented using a single coil.

In addition to the 3-wire transformer position sensor embodiments disclosed above, it is noted that a 3-wire position may also be implemented using a single, center-tapped coil. An example of an embodiment of one such sensor 800 is depicted in FIG. 8, and includes a single, center-tapped coil 802 with a core 804 constructed of a single section of magnetically permeable material 130 and one or more sections of non-magnetically permeable material 132. With this embodiment, the difference in length between the coil 802 and the core 804 is equal to the rectilinear displacement position of the core 804 (and thus the device to which the core 804 is coupled). This sensor 800 configuration uses amplitude to encode rectilinear two position sensing. While this sensor 800 configuration is less expensive than the dual coil embodiments described above, the dual coil configurations provide more robust position sensing over a larger temperature range.

The 3-wire, non-contacting transformer position sensor 100 described herein may be used to encode two discrete positions with arbitrary separation, and does so at a relatively low cost, low weight, and reduced complexity. The disclosed 3-wire transformer position sensor 100 also provides reliable operation over a relatively broad temperature range and in relatively harsh environments.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A position sensor, comprising:
   an excitation coil adapted to be electrically excited with an excitation signal, the output coil having a first end and a second end; and
   an output coil inductively coupled to the excitation coil upon electrical excitation of the excitation coil and configured, when it is balanced and the excitation coil is being electrically excited, to supply a null output signal, the output coil comprising:
   a first coil having a first end and a second end; and
   a second coil having a first end and a second end,
   wherein:
      the first end of the first coil is electrically connected to the second end of the second coil and to the second end of the excitation coil, to thereby define a common node,
      the second end of the first coil is electrically connected to the first end of the second coil, to thereby define a signal output node, and
      the first end of the excitation coil defines an excitation node.

2. The position sensor of claim 1, further comprising:
   a core disposed adjacent, and movable relative to, the excitation coil and the output coil, the core operable, upon movement thereof, to vary inductive coupling between the excitation coil and the output coil.

3. The position sensor of claim 2, wherein the core comprises a magnetically permeable material and a non-magnetically permeable material.

4. The position sensor of claim 2, wherein the core comprises a plurality of sections of magnetically permeable material, each section interposed by and coupled to a section of non-magnetically permeable material.

5. The position sensor of claim 1, wherein the excitation coil and output coil each comprise ceramic coated wire.

6. The position sensor of claim 1, further comprising a temperature compensation circuit coupled to the excitation coil and configured to supply a temperature signal having a voltage amplitude magnitude that is proportional to excitation coil temperature, the temperature compensation circuit comprising:
- a constant current circuit coupled to the excitation coil, the constant current circuit configured to supply a constant direct current (DC) to the excitation coil; and
- a filter circuit coupled to the excitation coil to receive a voltage signal representative of a voltage drop across the excitation coil and configured, upon receipt thereof, to supply the temperature signal.

7. The position sensor of claim 1, further comprising:
- a core disposed adjacent, and movable relative to, the excitation coil and the output coil, the core operable, upon movement thereof, to vary inductive coupling between the excitation coil and the output coil; and
- a signal processing circuit coupled to the excitation coil and the output coil, the signal processing circuit configured to (i) generate and supply an excitation signal to the excitation coil, (ii) receive an output signal from the signal output node, and (iii) upon receipt of the output signal, supply the position signal.

8. The position sensor of claim 7, wherein the signal processing circuit comprises:
- a driver coupled to receive an input signal and supply the excitation signal to the excitation coil;
- a filter coupled to receive the output signal from the signal output node and supply a conditioned output signal; and
- a processor coupled to, and configured to supply the input signal to, the driver, the processor further coupled to receive the amplified output signal from the filter and configured, in response thereto, to supply the position signal.

9. The position sensor of claim 8, further comprising:
- a plurality of resistors, each resistor having a first terminal and a second terminal and a resistance value unequal to another one of the resistors, the first terminal of each resistor individually coupled to separate pins of the processor, the second terminal of each resistor coupled to the driver and adapted to receive a voltage from an electric power source.

10. The position sensor of claim 9, wherein:
- the processor is further configured to selectively draw current from the electric power source through each of the resistors to thereby generates a stair-step sinusoidal excitation voltage;
- the driver is further configured to implement a filter; and
- the driver is coupled to receive the stair-step sinusoidal excitation voltage and supply a filtered stair-step sinusoidal voltage as the excitation signal.

11. The position sensor of claim 8, wherein the processor is further configured to:
- receive the amplified output signal and, implementing analog-to-digital (A/D) conversion, convert the output signal to a digital signal; and
- implement synchronous detection to determine the position of the core.

12. The position sensor of claim 1, further comprising:
- a core disposed adjacent, and movable relative to, the excitation coil and the output coil, the core operable, upon movement thereof, to vary inductive coupling between the excitation coil and the output coil;
- a temperature compensation circuit coupled to the excitation coil and configured to supply a temperature signal having a voltage amplitude magnitude that is proportional to excitation coil temperature; and
- a signal processing circuit coupled to the excitation coil, the output coil, and the temperature compensation circuit, the signal processing circuit configured to:
  supply the electrical excitation to the excitation coil;
  receive an output signal from the signal output node and the temperature signal from the temperature compensation circuit; and
  supply a temperature-compensated position signal representative of relative core position.

13. The position sensor of claim 12, wherein the temperature compensation circuit comprises:
- a constant current circuit coupled to the excitation coil, the constant current circuit configured to supply a constant direct current (DC) to the excitation coil; and
- a filter circuit coupled to the excitation coil to receive a voltage signal representative of a voltage drop across the excitation coil and configured, upon receipt thereof, to supply the temperature signal.

14. The position sensor of claim 12, wherein the signal processing circuit comprises:
- a driver coupled to receive an input signal and supply the excitation signal to the excitation coil;
- filter coupled to receive the output signal from the signal output node and supply a conditioned output signal; and
- a processor coupled to, and configured to supply the input signal to, the driver, the processor further coupled to receive the conditioned output signal from the filter and configured, in response thereto, to supply the temperature-compensated position signal.

15. A position sensor, comprising:
- an excitation coil adapted to be electrically excited with an excitation signal, the output coil having a first end and a second end;
- an output coil inductively coupled to the excitation coil upon electrical excitation of the excitation coil and configured, when it is balanced and the excitation coil is being electrically excited, to supply a null output signal, the output coil including a first coil and a second coil, the first coil having a first end and a second end, the second coil having a first end and a second end; and
- a core disposed adjacent, and movable relative to, the excitation coil and the output coil, the core operable, upon movement thereof, to vary inductive coupling between the excitation coil and the output coil, wherein:
- the first end of the first coil is electrically connected to the second end of the second coil and to the second end of the excitation coil, to thereby define a common node,
- the second end of the first coil is electrically connected to the first end of the second coil, to thereby define a signal output node, and
- the first end of the excitation coil defines an excitation node.

16. The position sensor of claim 15, wherein the core comprises a magnetically permeable material and a non-magnetically permeable material.

17. The position sensor of claim 16, wherein the core comprises a plurality of sections of magnetically permeable material, each section interposed by and coupled to a section of non-magnetically permeable material.

18. A position sensor, comprising:
an excitation coil coupled to receive an excitation signal, the excitation coil having a first end a second end;
inductively coupled to the excitation coil upon electrical excitation of the excitation coil and configured, when it is balanced and the excitation coil is being electrically excited, to supply a null output signal, the output coil including a first coil and a second coil, the first coil having a first end and a second end, the second coil having a first end and a second end;
a core disposed adjacent, and movable relative to, the excitation coil and the output coil, the core operable, upon movement thereof, to vary inductive coupling between the excitation coil and the output coil;
a constant current circuit coupled to the excitation coil, the constant current circuit configured to supply a constant direct current (DC) to the excitation coil;
a filter circuit coupled to the excitation coil to receive a voltage signal representative of a voltage drop across the excitation coil and configured, upon receipt thereof, to supply a temperature signal having a voltage amplitude magnitude that is proportional to excitation coil temperature;
a plurality of resistors, each of the resistors having a first terminal and a second terminal and a resistance value unequal to another one of the resistors, the first terminal of each resistor adapted to receive a voltage from an electric power source; and
a processor having a plurality of pins, each of the pins individually coupled to the second terminal of one of the resistors, the processor configured to: (i) selectively draw current from the electric power source through each of the resistors to thereby generate and supply a stair-step sinusoidal excitation voltage for the excitation coil, (ii) receive an output signal from the output coil, and (iii) upon receipt of the output signal, supply a position signal representative of relative core position, wherein:
the first end of the first coil is electrically connected to the second end of the second coil and to the second end of the excitation coil, to thereby define an electrical common node,
the second end of the first coil is electrically connected to the first end of the second coil, to thereby define a signal output node, and
the first end of the excitation coil defines an excitation node.

19. A temperature compensation circuit for an inductive position sensor having at least an excitation coil, the temperature compensation circuit comprising:
a constant current circuit coupled to the excitation coil, the constant current circuit configured to supply a constant direct current (DC) to the excitation coil; and
a filter circuit coupled to the excitation coil to receive a voltage signal representative of a voltage drop across the excitation coil and configured, upon receipt thereof, to supply a temperature signal having a voltage amplitude magnitude that is proportional to excitation coil temperature.

20. A signal processing circuit for an inductive position sensor having at least an excitation coil, an output coil, and a core disposed adjacent and movable relative to the excitation coil and the output coil, the signal processing circuit comprising:
a plurality of resistors, each of the resistors having a first terminal and a second terminal and a resistance value unequal to another one of the resistors, the first terminal of each resistor adapted to receive a voltage from an electric power source; and
a processor having a plurality of pins, each of the pins individually coupled to the second terminal of one of the resistors, the processor configured to:
selectively draw current from the electric power source through each of the resistors to thereby generate and supply a stair-step sinusoidal excitation voltage for the excitation coil, and
receive an output signal from the output coil, and
upon receipt of the output signal, supply a position signal representative of relative core position.

* * * * *